(12) United States Patent
Jorgensen (10) Patent No.: US 6,662,567 B1
(45) Date of Patent: Dec. 16, 2003

(54) TRANSITION DUCT MOUNTING SYSTEM

(75) Inventor: Stephen W. Jorgensen, Stuart, FL (US)

(73) Assignee: Power Systems Mfg, LLC, Jupiter, FL (US)

( * ) Notice: Subject to any disclaimer, the term of this patent is extended or adjusted under 35 U.S.C. 154(b) by 0 days.

(21) Appl. No.: 10/064,755

(22) Filed: Aug. 14, 2002

(51) Int. Cl.⁷ ............................................... F02C 7/20
(52) U.S. Cl. .......................................... 60/796; 60/800
(58) Field of Search ...................... 60/796, 800, 39.37, 60/805, 799

(56) References Cited

U.S. PATENT DOCUMENTS

| | | |
|---|---|---|
| 4,016,718 A | 4/1977 | Lauck |
| 4,422,288 A | 12/1983 | Steber |
| 4,719,748 A | 1/1988 | Davis, Jr. et al. |
| 4,987,736 A | 1/1991 | Ciokajlo et al. |
| 5,249,419 A | 10/1993 | Landhuis |
| 5,414,999 A | 5/1995 | Barnes |
| 5,572,863 A | 11/1996 | Wrightham et al. |
| 5,706,646 A | 1/1998 | Wilde et al. |
| 5,761,898 A | 6/1998 | Barnes et al. |
| 6,345,494 B1 | 2/2002 | Coslow |
| 6,442,946 B1 * | 9/2002 | Kraft et al. ................... 60/796 |
| 6,568,187 B1 | 5/2003 | Jorgensen et al. |

* cited by examiner

Primary Examiner—Ehud Gartenberg (57) ABSTRACT

A mounting system for fixturing a transition duct to a turbine inlet is disclosed. The mounting system includes a plurality of mounting plates having through holes and each plate having a spherical bearing, a plurality of washers, lock tabs, and a means for securing the mounting plates to the turbine inlet. In the preferred embodiment, the mounting system of the present invention is utilized to secure a transition duct having a thermally free aft frame to a turbine inlet.

16 Claims, 7 Drawing Sheets

TRANSITION DUCT MOUNTING SYSTEM

BACKGROUND OF INVENTION

This invention applies to the combustor section of gas turbine engines used in powerplants to generate electricity. More specifically, this invention relates to the structure that transfers hot combustion gases from a can-annular combustor to the inlet of a turbine.

In a typical can-annular gas turbine engine, a plurality of combustors are arranged in an annular array about the engine. The combustors receive pressurized air from the engine's compressor, add fuel to create a fuel/air mixture, and combust that mixture to produce hot gases. The hot gases exiting the combustors are utilized to turn a turbine, which is coupled to a shaft that drives a generator for generating electricity.

The hot gases are transferred from each combustor to the turbine by a transition duct. Due to the position of the combustors relative to the turbine inlet, the transition duct must change cross-sectional shape from a generally cylindrical shape at the combustor exit to a generally rectangular shape at the turbine inlet. In addition the transition duct undergoes a change in radial position, since the combustors are rigidly mounted radially outboard of the turbine.

The combination of complex geometry changes, rigid mounting means, as well as high operating temperatures seen by the transition duct create a harsh operating environment that can lead to premature deterioration, requiring repair and replacement of the transition ducts. To withstand the hot temperatures from the combustor gases, transition ducts are typically cooled, usually by air, either with internal cooling channels or impingement cooling. Severe cracking has occurred with internally air-cooled transition ducts having certain geometries that are rigidly mounted to the turbine inlet and operate in a high temperature environment. This cracking may be attributable to a variety of factors. Specifically, high steady stresses in the region around the aft end of the transition duct exist where sharp geometry changes occur and a rigid mount is located. Such a rigid mount located at the transition duct aft end does not allow for adequate movement due to thermal growth of the transition duct. In addition stress concentrations have been found that can be attributed to sharp corners where cooling holes intersect the internal cooling channels in the transition duct. Further complicating the high stress conditions are extreme temperature differences between portions of the transition duct.

The present invention seeks to overcome the shortfalls described in the prior art by specifically addressing the high steady stresses attributed to the rigid mounting system by providing an improved mounting system for connecting a transition duct to the inlet of a turbine. Typical mounting systems are fixed to the transition duct by a means such as welding and provide holes in the mount for bolting the transition duct to the turbine inlet. Having a fixed mounting system does not provide a means for compensating for changes in duct geometry and positioning due to thermal growth. The present invention overcomes this issue by providing a mounting system containing a plurality of bearings which allow the transition duct to adjust to thermal growth changes at points close in proximity to the turbine mounting points.

DETAILED DESCRIPTION

Figure 1:
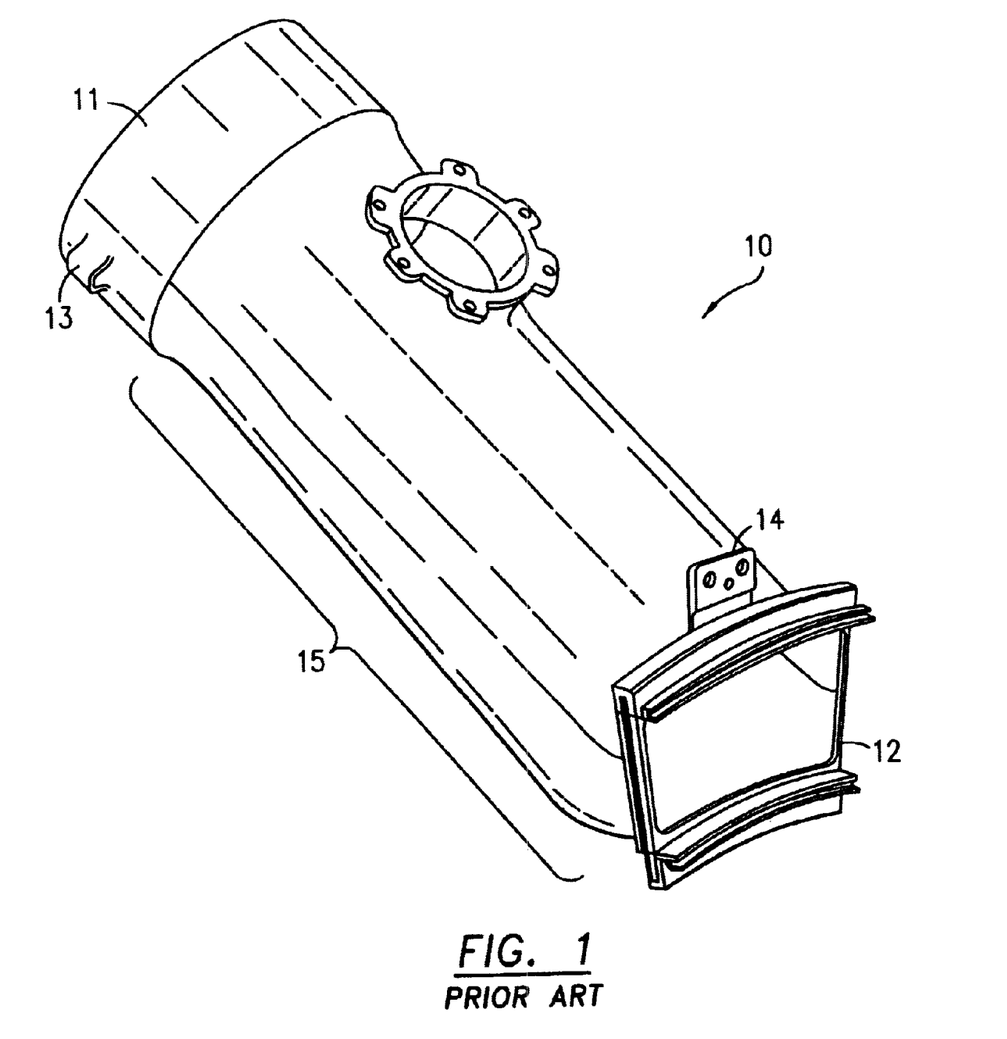
FIG. 1 is a perspective view of a transition duct of the prior art having a rigid mounting system.

Referring to FIG. 1, a transition duct 10 of the prior art is shown in perspective view. The transition duct includes a generally cylindrical inlet sleeve 11 and a generally rectangular exit frame 12. The generally rectangular exit shape is defined by a pair of concentric arcs of different diameters connected by a pair of radial lines. The can-annular combustor (not shown) engages transition duct 10 at inlet sleeve 11. The hot combustion gases pass through transition duct 10 and pass through exit frame 12 and into the turbine (not shown). Transition duct 10 is mounted to the engine by a forward mounting means 13, fixed to the outside surface of inlet sleeve 11 and mounted to the turbine by an aft mounting means 14, which is fixed to exit frame 12. A panel assembly 15, connects inlet sleeve 11 to exit frame 12 and provides the change in geometric shape for transition duct 10.

The present invention is shown in detail in FIGS. 2 through 7 and seeks to overcome the shortfalls of the prior art by providing an improved mounting system that allows for movement of the transition duct aft frame region due to thermal gradients. The mounting system of the present invention can be utilized with a variety of transition ducts, but will be discussed in accordance with the preferred embodiment.

Figure 2:
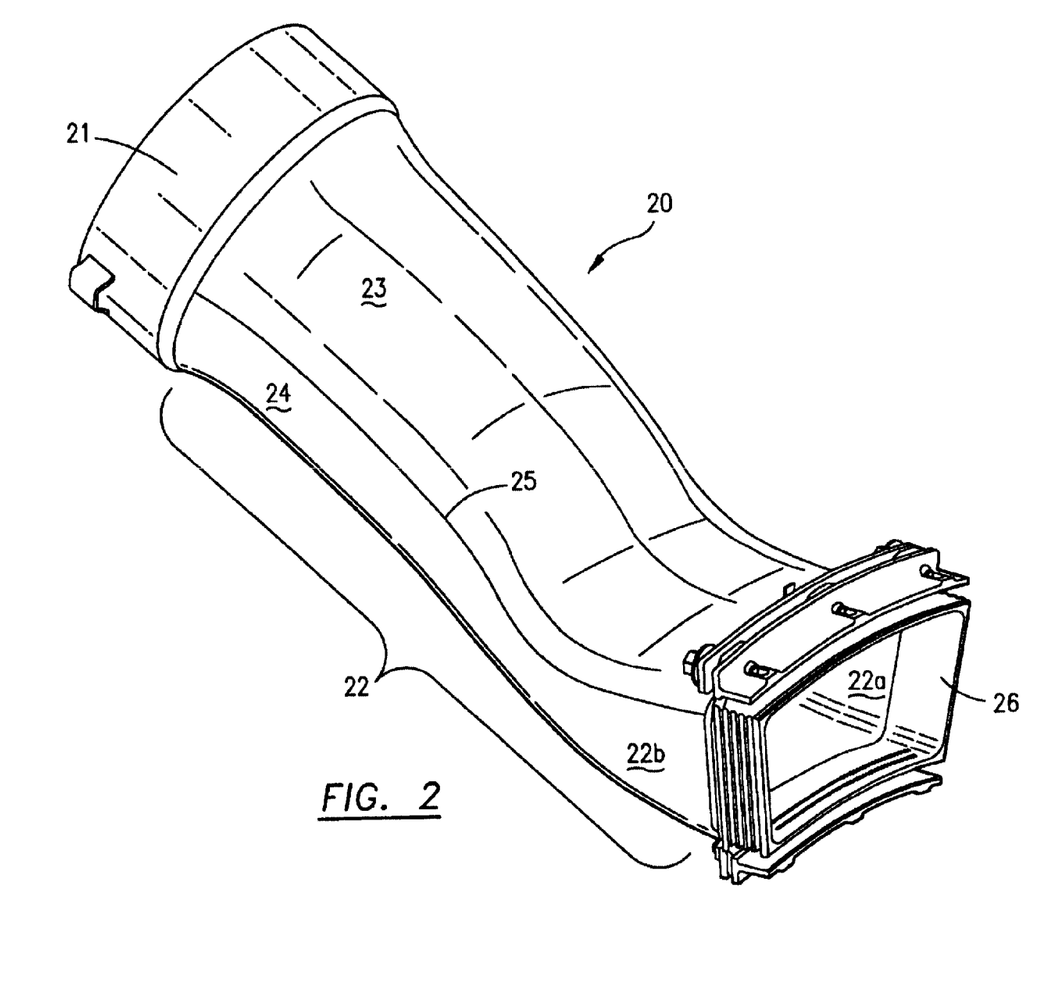
FIG. 2 is a perspective view of a transition duct incorporating the present invention.
Figure 5:
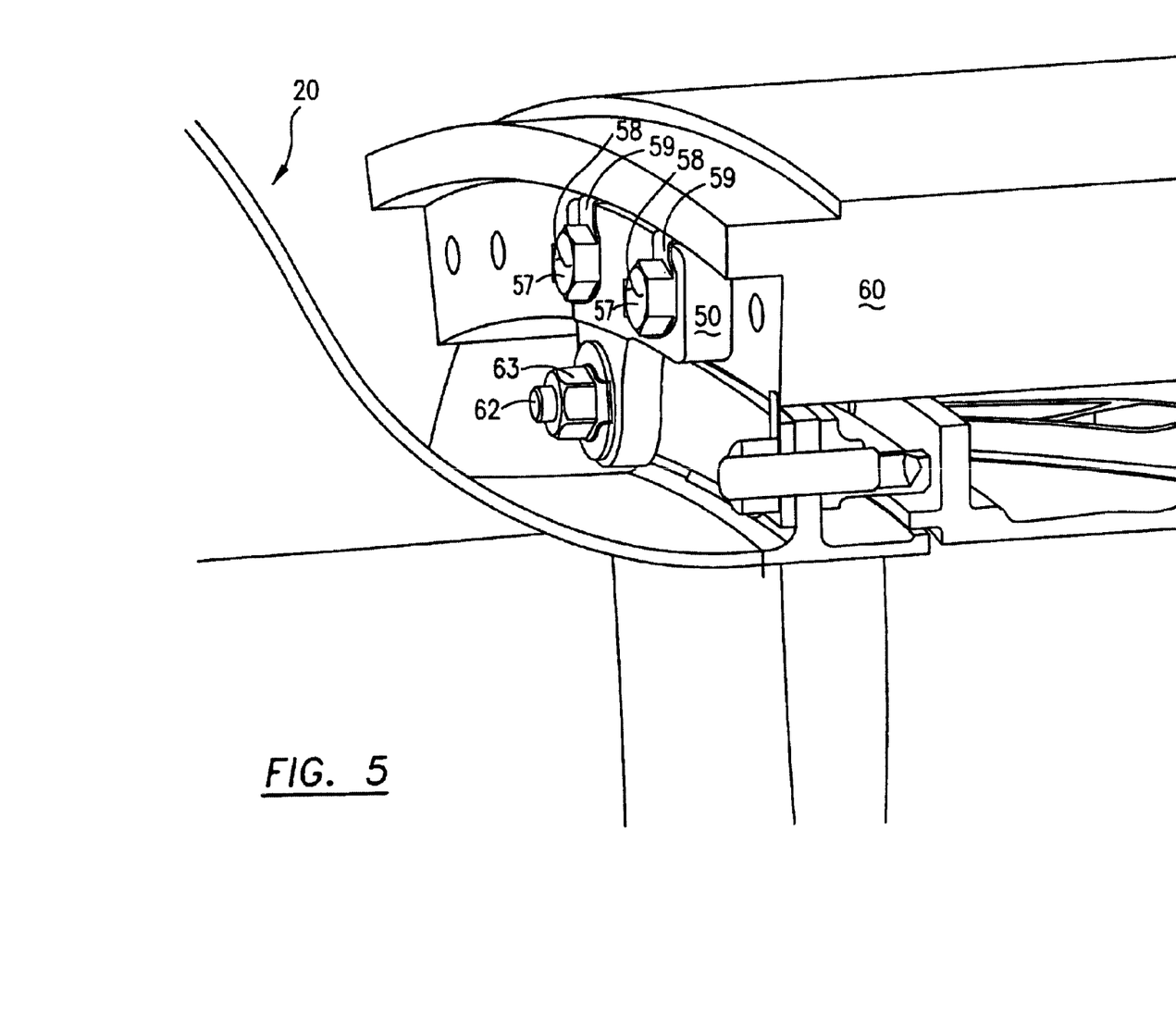
FIG. 5 is a partial cross section in perspective view of the present invention installed to a turbine inlet.

Referring to FIG. 2, the transition duct 20 includes a generally cylindrical inlet sleeve 21 having an inner diameter and an outer diameter. Fixed to inlet sleeve 21 is a panel assembly 22 having a first panel 23 and a second panel 24, with each panel formed from a single sheet of metal. Panel assembly 22 is formed when first panel 23 is fixed to second panel 24 along a plurality of axial seams 25 by a means such as welding. Once assembled, panel assembly 22 forms a duct having an inner wall 22a, an outer wall 22b, and a first thickness T1 there between as shown in FIG. 5. Referring back to FIG. 2, panel assembly 22 further contains a generally cylindrical inlet end and a generally rectangular end, with the exit end defined by a pair of arcs of different diameters concentric about a center, with the arcs connected by a pair of radial lines extending from the center. Fixed to the rectangular exit end of panel assembly 22 is a generally rectangular aft frame 26 having opposing sidewalls 27 that are generally perpendicular to the arcs of rectangular exit end of panel assembly 22 as shown in FIG. 3.

Figure 3:
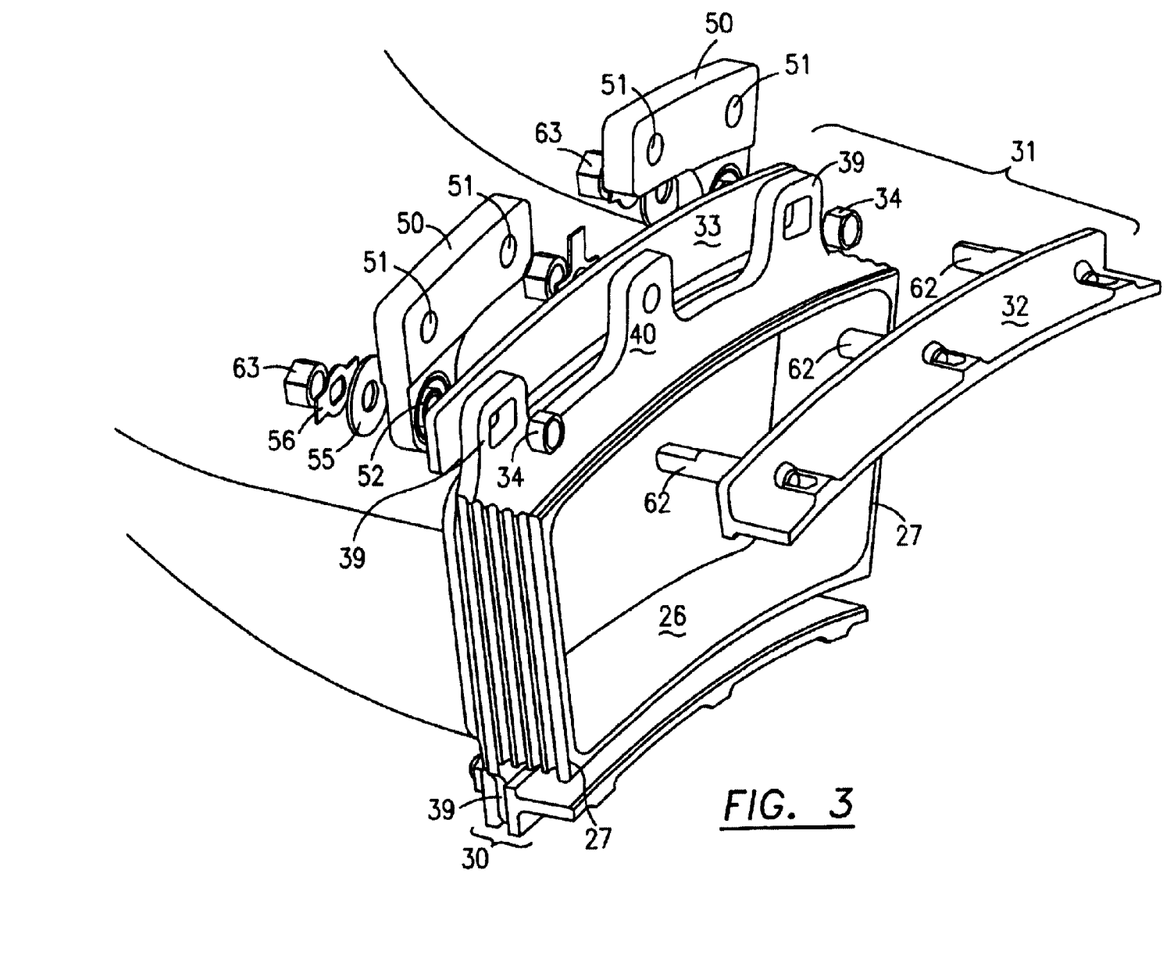
FIG. 3 is a perspective view of the transition duct aft frame incorporating the present invention.
Figure 4:
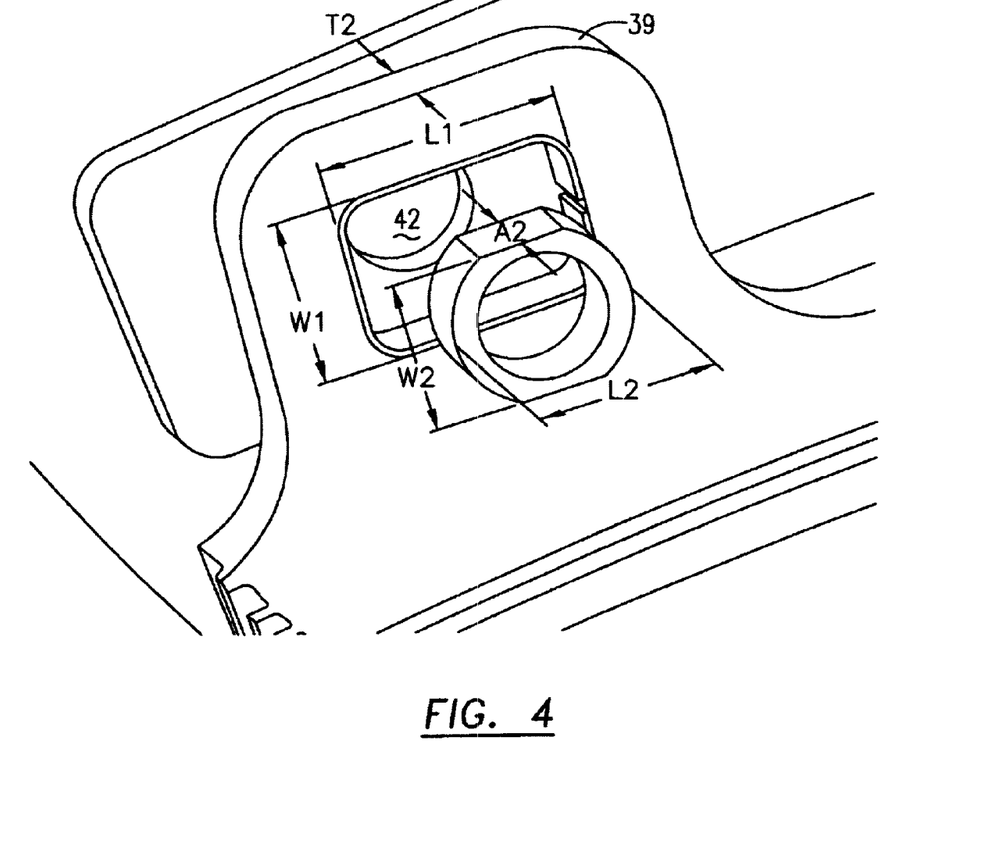
FIG. 4 is a detailed perspective view of the transition duct aft frame.

Referring now to FIG. 3, transition duct 20 further includes the features of a thermally free aft frame 26 as described in co-pending U.S. Patent Application entitled Thermally Free Aft Frame for a Transition Duct, and is hereby incorporated by reference. In the preferred embodiment of the transition duct mounting system, it is utilized in conjunction with a transition duct having thermally free aft frame. Transition duct 20 further includes a plurality of retention lugs 39 and 40. As shown in FIG. 4, each of retention lugs 39 and 40 have a second thickness T2 and contain a slot having a first circumferential length L1 and a first radial width W1. Outermost retention lugs 39 are located proximate the ends of the arcs that define the generally rectangular end and each outermost retention lug has a slot that includes a first circumferential length L1 greater than its first radial width W1.

Figure 7:
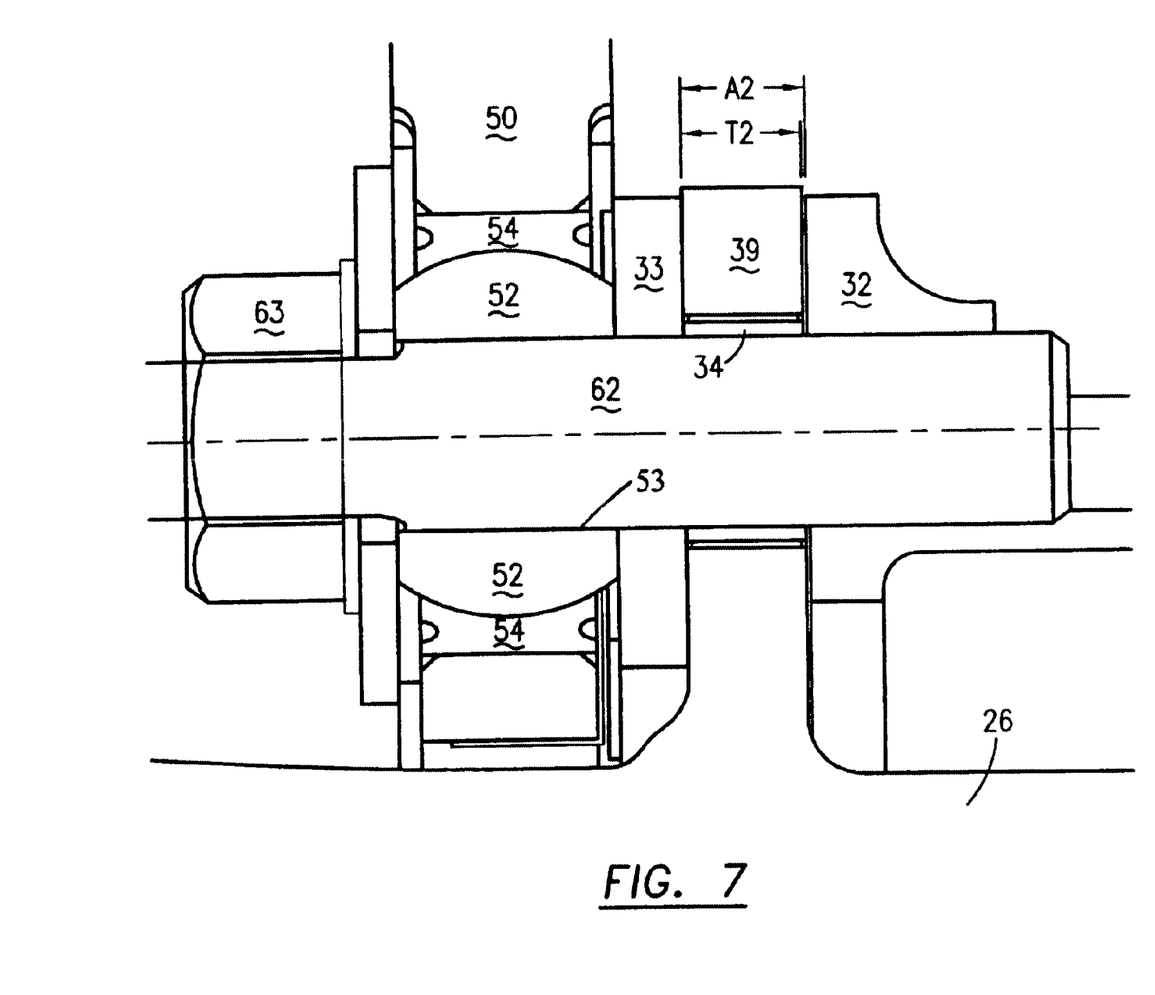
FIG. 7 is a detailed cross section view of the present invention.

Fixed to aft frame 26 through retention lugs 39 and 40 are inner and outer bulkhead assemblies 30 and 31. Inner bulkhead assembly 30 and outer bulkhead assembly 31 capture retentions lugs 39 and 40 in a manner that allows aft frame 26 to expand under thermal gradients. Inner and outer bulkhead assemblies 30 and 31 are identical in structural components and function and only differ in physical location. For clarity purposes, outer bulkhead assembly 31 will be described in further detail. For example, each bulkhead assembly includes a first and second bulkhead, each having a plurality of first and second holes, respectively. Referring to FIG. 3, outer bulkhead assembly 31 includes a first outer bulkhead 32 having first holes and a second outer bulkhead 33 having second holes. Furthermore, each bulkhead assembly includes a plurality of bushings 34, and as shown in FIG. 4, each bushing having a second axial length A2, a second circumferential length L2, a second radial width W2, and a third through hole. Bushings 34 are located within each slot of outer retention lugs 39 of aft frame 26 and are preferably pressfit into the slot. Bushings 34 are sized such that first circumferential length L1 of the slot in each of outer retention lugs 39 is greater than second circumferential length L2 of bushing 34, thereby allowing for relative circumferential movement of each of the outermost retention lugs 39, and hence aft frame 26, relative to the bushings received therein. To accommodate relative axial movement due to thermal growth, bushings 34 have a second axial length A2 greater than the second thickness T2 of outer retention lugs 39 as shown in FIG. 7. Due to vibration and movement amongst mating parts, bushings 34 are preferably manufactured from a hardened material such as Haynes 25.

Figure 6:
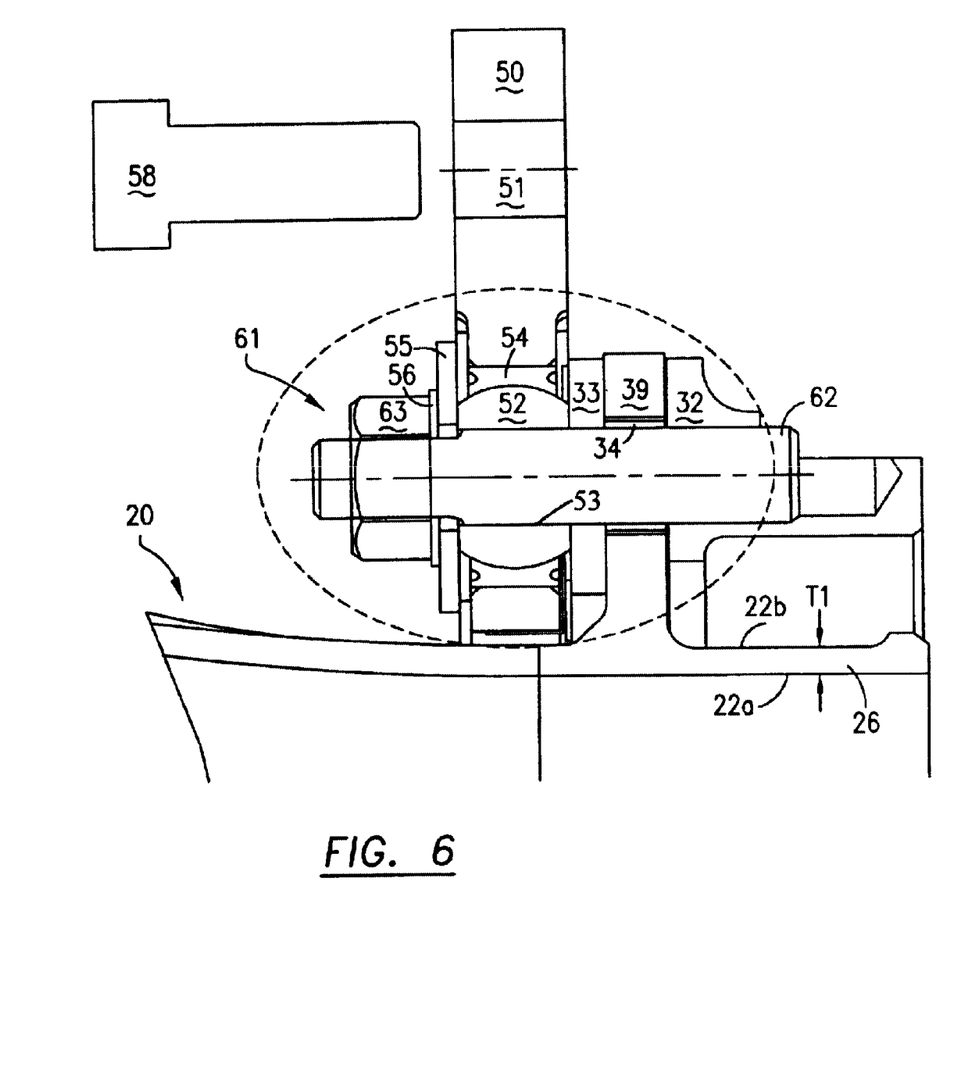
FIG. 6 is a cross section view of the present invention.

Referring now to FIG. 3, the transition duct aft mount assembly is disclosed. The aft mount assembly includes a plurality of mounting plates 50, each having at least a fourth through hole 51 and a spherical bearing 52 with a fifth through hole 53. Bearing 52 is located within a housing 54 (see FIGS. 6 and 7), which controls the amount of movement of bearing 52. In the preferred embodiment, mounting plates 50 have a general "L" shape with a plurality of fourth through holes 51. In order to reduce the amount of wear to spherical bearing 52 it is fabricated from a cobalt base alloy such as Stellite 6B while housing 54, though also fabricated from a cobalt base alloy, is preferably Haynes 25. Furthermore, the aft mount assembly includes a plurality of washers 55, a plurality of lock tabs 56, and a first means for securing 57 mounting plates 50 to turbine inlet 60. First securing means 57 preferably includes a bolt 58 and lock tab 59 for securing a transition duct to the turbine inlet region 60 of a gas turbine, as shown in FIG. 5. Referring to FIGS. 3 and 5, transition duct 20 is secured to the aft mount assembly at its aft frame 26 by a second securing means 61, which preferably includes a stud 62 and nut 63. As shown in FIGS. 6 and 7, stud 62 passes through a first hole in first outer bulkhead 32, through retention lug 39 and bushing 34, through a second hole in second outer bulkhead 33, through fifth hole 53 of bearing 52, through washer 55, through lock tab 56 and is secured to nut 63. Through the use of first securing means 57 and second securing means 61, transition duct 20 is engaged to the turbine inlet via the aft mount assembly. The use of bearing 52 allows for transition duct 20 to move relative to turbine inlet 60 which is necessary to account for growth in the transition duct aft frame 26 caused by thermal gradients. Aft frame 26, as described above, compensates for circumferential and axial thermal growth of the frame through the use of slots and bushings in outermost retention lugs 39, while the aft mount assembly, through the use of bearings 52, helps to compensate for rotation and twisting of aft frame 26 relative to turbine inlet 60. The use of the aft mount assembly thereby allows additional movement of aft frame 26 beyond that gained from the retention lug slots and bushings. This additional movement further reduces operating stresses in the region which will result in improved operability and extended component life.

While the invention has been described in what is known as presently the preferred embodiment, it is to be understood that the invention is not to be limited to the disclosed embodiment but, on the contrary, is intended to cover various modifications and equivalent arrangements within the scope of the following claims.

I claim:

1. A transition duct for a gas turbine engine comprising:
   a panel assembly having:
      a first panel formed from a single sheet of metal;
      a second panel formed from a single sheet of metal;
      said first panel fixed to said second panel along a plurality of axial seams by means such as welding, thereby forming a duct having an inner wall, an outer wall, and a first thickness therebetween said inner and outer walls, a generally cylindrical inlet end, and a generally rectangular exit end, said generally rectangular exit end defined by a pair of arcs of different diameters concentric about a center and connected by a pair of radial lines extending from said center;
   a generally cylindrical inlet sleeve having an inner diameter and outer diameter, said inlet sleeve fixed to said inlet end of said panel assembly;
   a generally rectangular aft frame having opposing sidewalls, said frame fixed to said exit end of said panel assembly;
   a plurality of retention lugs located on said aft frame proximate said arcs of said generally rectangular exit end; each of said retention lugs having a second thickness and containing a slot having a first circumferential length and a first radial width; the outermost retention lugs located proximate ends of said arcs which define said generally rectangular exit end;
   inner and outer bulkhead assemblies including:
      a first inner and first outer bulkhead having a plurality of first through holes;
      a second inner and second outer bulkhead having a plurality of second through holes;
      a plurality of bushings, each bushing having a second axial length, a second circumferential length, a second radial width, and a third through hole, each of said bushings is located within one of said slots of said outermost retention lugs;
   an aft mount assembly for fixturing a transition duct to the turbine inlet region of a gas turbine comprising:
      a plurality of mounting plates each having at least a fourth through hole and a spherical bearing located within a housing, said spherical bearing having a fifth through hole;
      a plurality of washers;

a plurality of lock tabs;

a first means for securing said mounting plates to a turbine inlet of a gas turbine engine wherein said first securing means passes through said fourth hole in said mounting plate;

a second securing means for securing said aft mount assembly and said bulkhead assemblies to said aft frame such that said second securing means passes through at least one of said retention lugs of said aft frame, through at least one of said first and second through holes of said bulkheads, one of said spherical bearings of said aft mount assembly, and one of said lock tabs.

2. The transition duct of claim 1 wherein the second axial length of each of said bushing is greater than the second thickness of each of said retention lugs.

3. The transition duct of claim 1 wherein each of said bushings are pressfit within one of said slots of said outermost retention lugs.

4. The transition duct of claim 1 wherein each of said bushings are fabricated from Haynes 25 material.

5. The transition duct of claim 1 wherein the slots in said outermost retention lugs have a greater first circumferential length than first radial width.

6. The transition duct of claim 1 wherein the first circumferential length of said slot in said retention lug is greater than the second circumferential length of the bushings received therein, thereby allowing for relative circumferential movement of the retention lugs relative to said bushings.

7. The aft mount assembly of claim 1 wherein said mounting plates have an "L" shape.

8. The aft mount assembly of claim 1 wherein said first means for securing said aft mount assembly to a turbine inlet includes a plurality of bolts and lock tabs.

9. The aft mount assembly of claim 1 wherein said second securing means for securing said mounting plates to said aft frame mount region is through a stud and nut.

10. The aft mount assembly of claim 1 wherein said spherical bearing is fabricated from Stellite 6B.

11. The aft mount assembly of claim 1 wherein said bearing housing is fabricated from Haynes 25.

12. An aft mount assembly for a gas turbine transition duct that allows for multiple axis movement at a plurality of locations comprising:

a plurality of mounting plates each having at least a fourth through hole and a spherical bearing located within a housing, said spherical bearing having a fifth through hole;

a plurality of washers;

a first means for securing said mounting plates to a turbine inlet of a gas turbine engine wherein said first securing means passes through said fourth hole in said mounting plate;

a plurality of lock tabs.

13. The aft mount assembly of claim 12 wherein said mounting plates have an "L" shape.

14. The aft mount assembly of claim 12 wherein said first means for securing said aft mount assembly to a turbine inlet includes a plurality of bolts and lock tabs.

15. The aft mount assembly of claim 12 wherein said spherical bearing is fabricated from Stellite 6B.

16. The aft mount assembly of claim 12 wherein said bearing housing is fabricated from Haynes 25.

* * * * *